March 17, 1959 C. D. GRIM 2,877,921
POSITIVE SEAL, QUICK OPENING CAP FOR PRESSURE VESSELS
Filed March 22, 1956 3 Sheets-Sheet 1

INVENTOR.
CLYDE D. GRIM
BY
HIS ATTORNEY

March 17, 1959 C. D. GRIM 2,877,921
POSITIVE SEAL, QUICK OPENING CAP FOR PRESSURE VESSELS
Filed March 22, 1956 3 Sheets-Sheet 2

*INVENTOR.*
CLYDE D. GRIM
BY
*William J. Ruano*
HIS ATTORNEY

March 17, 1959 C. D. GRIM 2,877,921
POSITIVE SEAL, QUICK OPENING CAP FOR PRESSURE VESSELS
Filed March 22, 1956 3 Sheets-Sheet 3
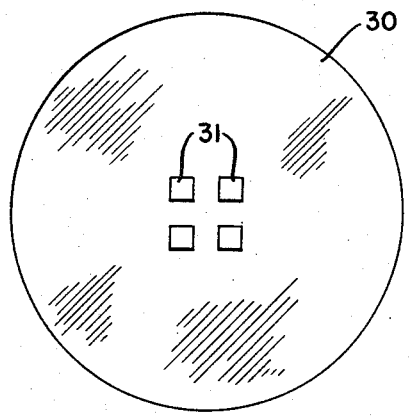
FIG. 10
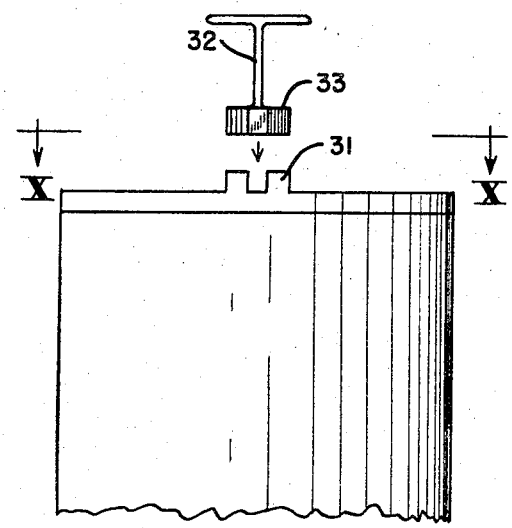
FIG. 11
FIG. 12
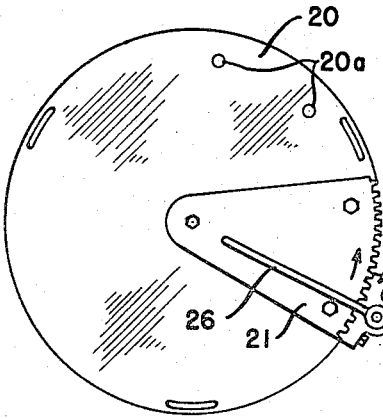
FIG. 7
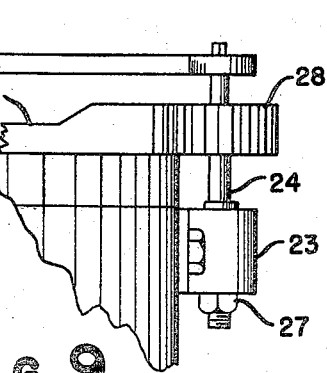
FIG. 9
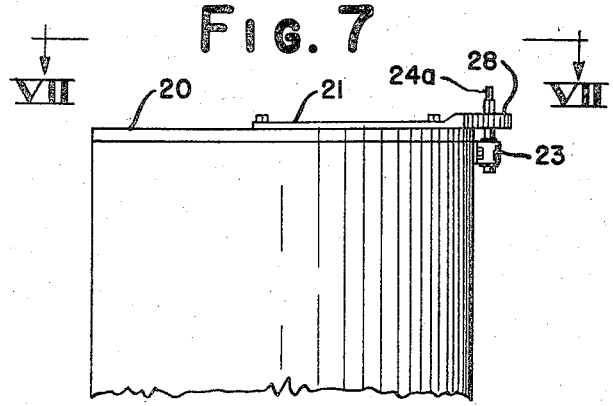
FIG. 8
INVENTOR.
CLYDE D. GRIM
BY
*William J. Reans*
HIS ATTORNEY

United States Patent Office 2,877,921
Patented Mar. 17, 1959

2,877,921

POSITIVE SEAL, QUICK OPENING CAP FOR PRESSURE VESSELS

Clyde D. Grim, Reading, Pa.

Application March 22, 1956, Serial No. 573,193

1 Claim. (Cl. 220—39)

This invention relates to a positive seal, quick opening cap for large vessels, particularly, pressure vessels used in industrial processes, such as nuclear reactors and the like.

In various industries, such as in nuclear power plants, chemical plants etc., large vessels are used to serve as heat exchangers, barrel-type boiler feed pumps, air compressors, pressure vessels and the like for the power plant, which vessels must be kept very tightly sealed so as to confine steam or water under high pressure. Often times such vessels are welded to the container to insure an air tight seal. However, such seals have the outstanding disadvantage that they must be broken by time consuming methods which involve considerable expense, such as by use of welding torches, when a fault occurs within the vessel, such as the occurrence of contamination by radioactive materials in a heat exchanger for a nuclear power plant. Other conventionally used means, such as bolts, for providing seals are sometimes unsatisfactory since bolts apply positive pressure only at points through which the bolts pass and not at intermediate points, therefore leakage is apt to develop at such intermediate points. Moreover, well-known types of seals and sealing gaskets are not always satisfactory for insuring a tight seal, particularly under very high pressure and temperature conditions.

An object of the present invention is to overcome the above mentioned disadvantages of conventional seals for large pressure vessels and to provide novel means for positively sealing a cap on pressure vessels and for enabling quick opening of the vessel or breaking of the seal as often as desired and in an amazingly short time as compared to former methods.

A more specific object of the present invention is to provide a power operated or mechanically or hand operated, screw threaded cap for effecting sealing or unsealing of the cap with respect to an open, screw threaded top of a pressure vessel and for insuring a positive, air tight, seal even against extremely high pressures and temperatures.

Other objects and advantages of the invention will become more apparent from a study of the following description taken with the accompanying drawings wherein:

Figures 7 and 8 are top and side views, respectively, of an alternate form of cap sealing device which is manually operated, Figure 7 being taken along line VII—VII of Figure 8;

Figure 9 is an enlarged, fragmentary view of the manually operated sealing device shown in Figure 8;

Figures 10 and 11 are top and side views, respectively, of another alternate form of manually operated sealing device, Figure 10 being taken from line X—X of Figure 11; and Figure 12 is an enlarged, elevational view of shaft 24 shown in Figure 9.

Figure 1:
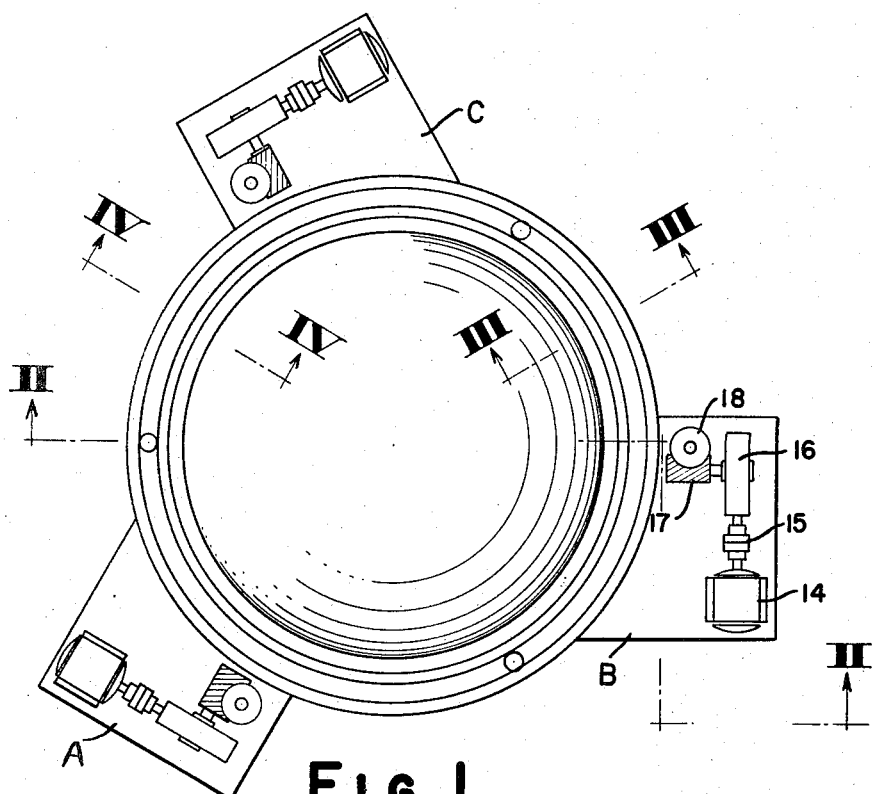
Figure 1 is a plan view of a pressure vessel equipped with a positive seal, quick opening cap which is powered by one or more electric motor drives in accordance with the teachings of the present invention.
Figure 2:
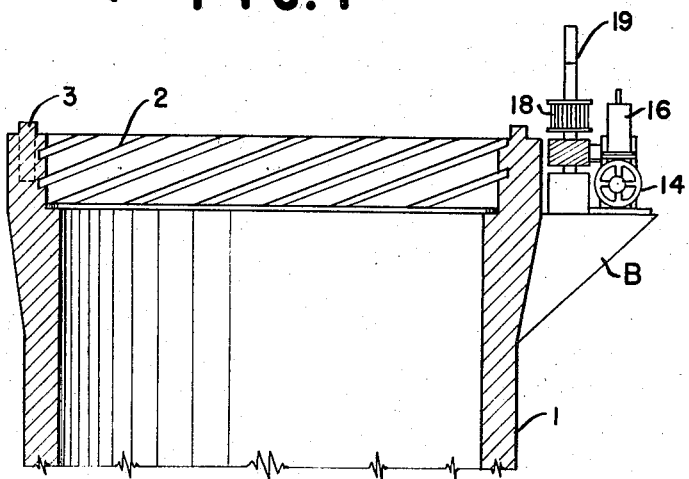
Figure 2 is a longitudinal cross-sectional view taken along line II—II of Figure 1.

Referring more particularly to Figures 1 and 2 of the drawing, numeral 1 denotes the top portion of a cylindrical vessel of steel, aluminum or other suitable material, which vessel has an open top end or mouth provided with threads 2 as shown. Such threads are preferably disposed at such angle with respect to the vertical axis so as to enable unscrewing of the cap by turning the cap only through an angle of about 45°. It will be understood, however, that threads of any desired pitch for unscrewing the cap as a consequence of any desired amount of turning of the cap may be used instead.

Figure 5:
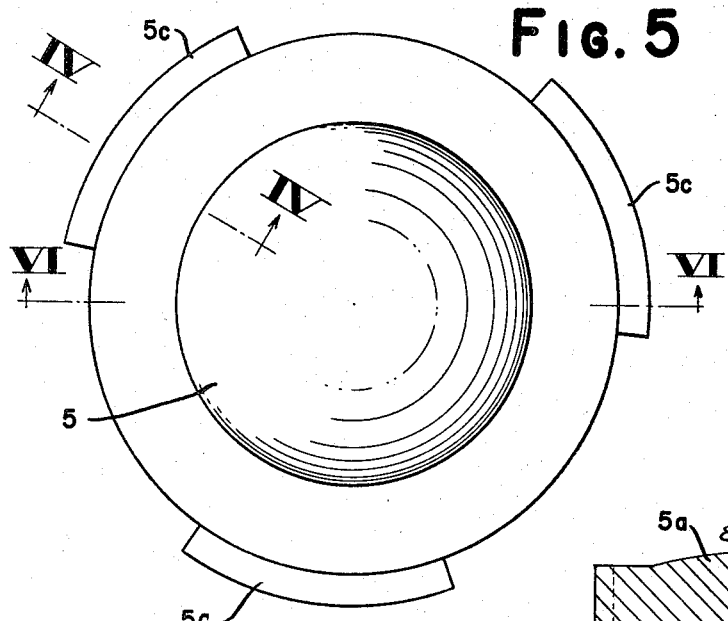
Figure 5 is a top plan view of an externally threaded type of cap.
Figure 6:
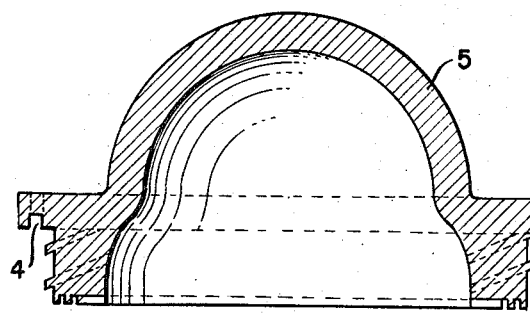
Figure 6 is a longitudinal cross-sectional view taken along line VI—VI of Figure 5.
Figure 3:
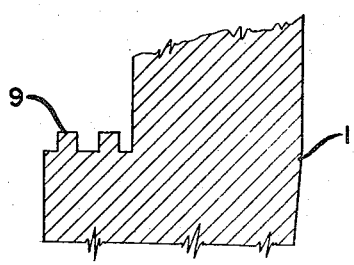
Figure 3 is an enlarged, cross-sectional view taken along line III—III of Figure 1 but wherein the cap is omitted.

On the top of vessel 1 there is provided an integral annular projection or ring 3 which serves as a sealing ring and which is engageable in a corresponding aperture 4 in cap 5, such as shown in Figure 6. Although cap 5 is shown with a bulbous top portion such portion may be flat if so desired. Cap 5 is provided with external threads 6 which are screw threaded onto threads 2 on the top of the vessel. As shown more clearly in Figure 5, cap 5 is provided with three arcuate segments 5c having gear teeth formed thereon so that the cap may be driven by electrically powered means to be described hereinafter.

Figure 4:
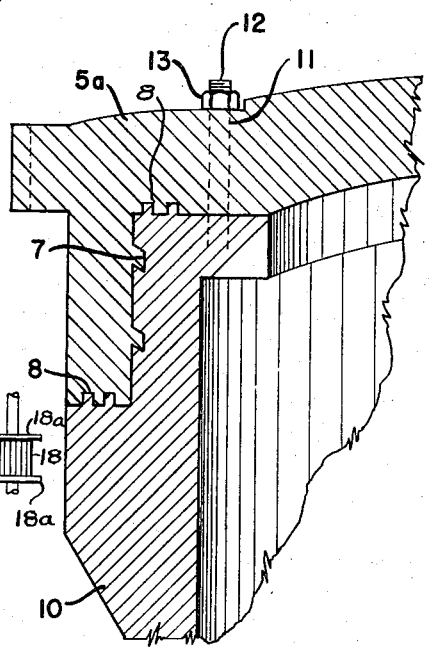
Figure 4 is an enlarged, fragmentary, cross-sectional view taken along line IV—IV of Figure 1 and showing an alternate threaded type of cap.

Figure 4 shows an alternate form of cap 5a which is internally threaded with threads 7, instead of being externally threaded, and which has a pair of grooves 8 on the lower and upper portions thereof which are engageable with the upstanding sealing rings 9 formed near the top of vessel 10. Threads 7 are preferably tapered as shown to improve the sealing of the cap.

Figure 2 shows, more clearly, the internal threads of the vessel body.

A cylindrical hole 11 is formed through caps 5 and 5a and the top portion of vessels 1 and 10 through which there extends a screw threaded tapered pin 12 which can be lifted by the turning of a nut 13. The purpose of the pin 12 is to provide a lock to prevent relative displacement of the cap with respect to the vessel after the cap has been screw threaded to the closed or sealed position.

Power driven means are provided to screw the cap onto the vessel 1 to effect a seal, also to unscrew the cap to break the seal when desired. One or more drives may be employed for this purpose. Three drive units A, B and C are shown on the drawing, although it should be understood that any other number of units may be used instead, such as 1, 2, 4 etc. Each unit is provided with a base which is integrally secured to the side and top portion of the vessel as shown in Figure 2. Since the power drives of the various units are identical, a description of only one will suffice, Each power drive unit comprises a driving motor 14, preferably an electric motor, such as a series or compound motor, which drives through a coupling 15 and through a gear reducer 16 for considerably reducing the speed of the driving member 17 as compared to the speed of the motor shaft. Driving member 17 may be in the form of a worm which drives a worm wheel rigidly coupled to a vertically extending drive shaft 19. A pinion 18 is keyed to the vertical shaft 19 and is vertically slidable with respect thereto. The teeth of pinion 18 are adapted to engage corresponding teeth in the arcuate rack formed along the outer side of the arcuate segment 5c, as shown more clearly in Figures 5 and 6. Pinion 18 is provided with horizontally extending flanges which are adapted to slide against the top and bottom surfaces of the end portions of the arcuate segment 5c so that the pinion will ride on and move up and down in exact accordance with such movements of the cap 5 as it is being screwed into sealing engagement or unscrewed therefrom.

In operation, assuming that the cap 5 or 5a is removed from the top of the vessel. The cap may be lifted and lowered into position onto the top of the vessel by means of an overhead crane or other power means which may be electrically interlocked, by means of a switch (not shown) on the gear rack, to stop the lowering movement when the grooves 2 in the vessel 1 and in cap are lined up so that the cap is in readiness to be lowered. Any suitable and well known electrical means may be employed, such as a double throw switch operated in the crane or nearby position to transfer the crane hoist motor from a resistance bank to a series connection to include the drive motor or motors 14. The lowering movement can then proceed with the proper gear and turning ratio of the drive and lowering movement of the hoist or crane to lower the cap into position for sealing. Preferably the arcuate length of travel of threads 2 is of the order of 45° whereas the total length of arcuate movement of the cap from the unscrewed position to the screwed position, that is beyond the limits of the threads, may be of the order of 54°. Of course, other suitable limits of movement or tapers of threads may be used instead as desired. When the cap has been screw threaded sufficiently tightly to complete the seal conventional limit switches located on the vessel 1 will cut off the power supply. The threaded pins having screw threaded shanks 12 are then inserted in the respective holes 11 so as to lock the cap to the vessel and prevent accidental unscrewing of the cap.

When it is desired to break the seal and unscrew the cap, the threaded pins or shanks 11 are first removed by screwing down on the nuts 13 to break the seal of the pins in their respective holes. The controller for the drives is then reversed so that the crane and drive units will simultaneously lift and turn or unscrew the cap until the threads are separated. Limit switches may be provided to stop this motion when the cap is completely unscrewed. A double throw switch may then be operated to cut out the drive motors and connect the hoist motor of the crane in series with the resistance bank.

The crane can then be moved to any position desired to place the cap or cover in position for storing after which it is available for other uses.

To prevent galling or burring of the threads or grooves they may be plated with suitable material. In this event, sufficient clearance should be provided for the application of a high temperature-high pressure silicone lubricant which is used to assist in placing and removing of the cap.

It will be understood that the above described motor drive is merely illustrative of a suitable drive that may be used for applying power to effect relative rotation of the cap or vessel. It will be understood that other types of drives, and perhaps even gasoline driven motor drives or the like, may be used for applying power to effect rotation of the heavy cap.

As a consequence of the continuity of the threads and sealing rings provided on the cover and open portion of the vessel, also in view of the arrangement of the power driving means, it will be apparent that a continuous, pressure-tight seal is provided along the entire periphery of the vessel opening and cover which will insure against leakage even in cases where high pressures and high temperatures are prevalent in the vessel, such as in heat exchangers for nuclear reactors etc.

Figures 7, 8, and 9, show a modification of the positive seal, quick opening cap, which instead of being electrically or power driven is manually operable. The end cap 20 is provided with two sets of holes 20a into which suitable pins or bolts may be inserted for fastening the gear rack 21 selectively to the right side as shown or if desired to the left side of the vertical. A bearing 23 is mounted by bolts on the periphery of the tank and is adapted to receive a shaft 24 having hexagonal portion 24a (or other polygonal shape) onto which is adapted to be slid into driving relationship a correspondingly shaped opening at the end of the handle 26. A nut 27 is screw threaded onto the threaded end of the shaft for holding a pinion 28 in place in keyed relationship to the shaft. Pinion 28 rests on a shoulder portion of shaft 24, which shoulder portion acts as a stop to limit downward movement of the pinion. The various parts are easily installed and removed from the cap and body of the vessel. With the gear rack fastened as shown, the handle must be moved in a downward direction for closing which downward direction is a better position for applying pressure than would be an upward direction or lifting of the handle. It will be noted that instead of fastening the end of handle directly onto shaft 24 it may be connected thereto by means of a conventional pawl and ratchet (not shown).

Figures 10 and 11 show a further modification of a manually operated means for opening or closing the cap. The cap 30 has lugs 31 integrally cast therein or secured thereto. A wrench 32 having a cruciform shaped end 33 is adapted to be fitted into the cruciform opening provided by the lugs so that turning of the handle will effect turning movement of the cap.

Similarly other mechanical drives or couplings may be employed, particularly for smaller vessels. The above described mechanical drives may be used with the same threading of the cap and body portions of the vessel as described in Figures 1 to 6.

Thus it will be seen that I have provided an efficient power operated, motor driven means for effecting a quick and reliable seal between the cap and an open ended cylindrical vessel despite the fact that the vessel may be of enormous size and weight; furthermore, I have provided both power operated and manually operated mechanical drives for effecting easy access and positive as well as quick closing and opening movements of a cap, both of the internally and externally threaded type; furthermore, I have provided a hermetic seal between the cap and body portion of a cylindrical vessel, which seal is absolutely pressure-tight as a consequence of application of tremendous forces in the proper direction.

I claim:

In a large vessel having a circular open end, a cover for closing said end, the mouth portion of said vessel and said cover having screw threaded peripheral portions provided with screw threads disposed at such angle with respect to the longitudinal axis of said vessel that the cover may be screwed tightly onto the vessel by partial rotation of the cover through an acute angle, said mouth portion of the vessel having a circular ledge portion forming a metal-to-metal seal with the lower peripheral surface portion of said cover, a plurality of brackets integrally secured to the outer, top, peripheral portion of said vessel to serve as bases, reversible power operating means on each of said bases comprising an electric motor, gear reducing means driven thereby and a pinion driven by said gear reducing means having free vertical sliding movement while driven by said motor and having its axis disposed vertically in parallel relationship to that of said vessel, said cover having a peripheral portion provided with gear teeth which are in engagement with said pinion, said pinion being provided at the top and bottom thereof with horizontally extending circular flanges which are slidably engageable on the top and bottom surfaces of said peripheral portion of said cover, said cover being raised and lowered with respect to said vessel in response to rotation of said power operating means in one direction or in an opposite direction to break or make said seal.

References Cited in the file of this patent

UNITED STATES PATENTS

| | | |
|---|---|---|
| 1,663,755 | Gammeter | Mar. 27, 1928 |
| 1,833,208 | Davidson | Nov. 24, 1931 |
| 1,929,644 | Le Roy | Oct. 10, 1933 |
| 2,435,913 | Wall | Feb. 10, 1948 |
| 2,697,536 | Cicero | Dec. 21, 1954 |

FOREIGN PATENTS

| | | |
|---|---|---|
| 524,940 | Great Britain | Aug. 19, 1940 |
| 889,783 | Germany | Sept. 14, 1953 |